United States Patent
Ponikiewski et al.

(10) Patent No.: US 11,014,597 B2
(45) Date of Patent: May 25, 2021

(54) STEERING COLUMN ASSEMBLY

(71) Applicant: TRW Steering Systems Poland Sp. Z.o.o., Czechowice-Dziedzice (PL)

(72) Inventors: Pawel Ponikiewski, Swinna (PL); Artur Wojtalik, Katowice (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 101 days.

(21) Appl. No.: 16/510,173

(22) Filed: Jul. 12, 2019

(65) Prior Publication Data
US 2020/0031383 A1     Jan. 30, 2020

(30) Foreign Application Priority Data

Jul. 25, 2018   (EP) .................................... 18461594

(51) Int. Cl.
*B62D 1/19* (2006.01)

(52) U.S. Cl.
CPC .................................. *B62D 1/195* (2013.01)

(58) Field of Classification Search
CPC .................................................... B62D 1/195
See application file for complete search history.

(56) References Cited

U.S. PATENT DOCUMENTS

| | | | | |
|---|---|---|---|---|
| 6,095,012 A * | 8/2000 | Lutz | ....................... | B62D 1/184 74/493 |
| 7,387,045 B2 * | 6/2008 | Klukowski | ............ | B62D 1/184 280/775 |
| 9,010,807 B2 * | 4/2015 | Schnitzer | ................. | B62D 1/16 280/779 |
| 2005/0178231 A1 * | 8/2005 | Schick | ................... | B62D 1/184 74/493 |
| 2008/0087129 A1 * | 4/2008 | Kaneko | ................... | B62D 1/184 74/493 |
| 2009/0151498 A1 * | 6/2009 | Garbrecht | ................ | B62D 1/19 74/493 |
| 2020/0189642 A1 * | 6/2020 | Sugishita | .............. | B60R 25/021 |

FOREIGN PATENT DOCUMENTS

EP       2487088 A1    8/2012
JP      2008149969 A    7/2008

* cited by examiner

*Primary Examiner* — Faye M Fleming
(74) *Attorney, Agent, or Firm* — Robert James Harwood

(57) ABSTRACT

A steering column assembly includes a shroud; a steering shaft, which is supported by the shroud; a support bracket, a clamp, and a clamp mechanism. The support bracket is configured to be secured to a fixed part of the vehicle and includes two arms that depend from a base portion to embrace the shroud. The clamp pin extends through an opening in each of the arms of the support bracket and in a slot in the shroud. The clamp mechanism is movable between an unclamped position in which the shroud can move relative to the support bracket and a clamped position in which the shroud is fixed relative to the support bracket.

20 Claims, 2 Drawing Sheets

STEERING COLUMN ASSEMBLY

CROSS-REFERENCE TO RELATED APPLICATIONS

This application claims priority to European Patent Application No. 18461594.6, filed 25 Jul. 2018, the disclosure of which is incorporated herein by reference in its entirety.

TECHNICAL FIELD

The present invention relates to improvements in steering column assemblies. More particularly, the invention relates to steering column assemblies including a frictional clamping system.

BACKGROUND

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown Onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion. In some cases, the shroud will not include two portions and instead the shroud will simply move relative to the bracket.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle. The clamp mechanism may be adjustable to permit reach adjustment, or rake adjustment, or both, of the steering wheel. In the event of a crash the shroud must be able to move, and this is achieved if it is able to break free of the clamp mechanism, or for the support bracket to be able to break free of the vehicle body, to allow the steering column assembly to collapse telescopically.

A lever may be provided on an end of the a clamp bolt that forms a part of the clamp mechanism that the driver can push or pull to rotate the clamp bolt and thereby operate the clamp mechanism.

Steering column assemblies are known which include a clamp mechanism that relies solely on friction when locked to prevent unwanted movement of the column assembly. The clamp mechanism can be unlocked and locked by movement of a locking lever or, sometimes, electrically using a motor or perhaps hydraulically or pneumatically. These columns can typically resist radial and/or axial forces of 600 N applied at the steering wheel before slipping.

However, it is increasingly a requirement from car manufacturers that there should be no substantial movement of the steering column assembly when forces of up to 5000 N are applied. The objective is to prevent unwanted movements of the steering wheel in a crash so that the deployment of the air bag is ideally controlled.

Known positive locking assemblies, which include toothed blocks that fit within corresponding toothed rails, provide locking at set positions due to the engagement of the teeth of the block and rail. This form of positive locking can be used in both reach and rake directions. However, the downside of a tooth-based positive locking assembly is that unless the teeth are perfectly aligned, tooth-on-tooth impacts can occur during damping. If excessive force is applied by the driver to the clamp lever to force it to complete its travel, permanent damage can occur to the tips of the teeth. At the very least, such a tooth-on-tooth occurrence will require the driver to consciously re-release the lever, find a slightly different wheel position and then re-engage the lever. Unless special means are provided to overcome this problem, then it is likely to occur during 10% to 20% of all adjustment operations. This is undesirable.

SUMMARY

According to a first aspect, there is provided a steering column assembly for a vehicle, the steering column assembly comprising: a shroud; a steering shaft, which is supported by the shroud; a support bracket, a clamp, and a clamp mechanism. The support bracket is configured to be secured to a fixed part of the vehicle and includes two arms that depend from a base portion to embrace the shroud. The clamp pin extends through an opening in each of the arms of the support bracket and in a slot in the shroud. The clamp mechanism is movable between an unclamped position in which the shroud can move relative to the support bracket and a clamped position in which the shroud is fixed relative to the support bracket.

The clamp mechanism further includes a set of interleaved plates and a cam mechanism. The set of interleaved plates includes a first subset of plates and a second subset of plates, the first subset of plates being interleaved with the second subset of plates. The first subset of plates is secured to the support bracket and the second subset of plates is secured to the shroud. The cam mechanism is configured such that, in the clamped position of the clamp mechanism, the interleaved plates are compressed between the cam mechanism and the shroud to restrict relative movement of the shroud and support bracket.

The support bracket and shroud are therefore prevented from relative movement by the actions of friction between the interleaved plates. Due to the multiple plates involved, the static friction between the plates is much higher than in assemblies whereby the support bracket bears directly on the shroud. By changing the number or material of the plates, the assembly can be tuned by the designer to have the required level of friction.

The first subset and second subset of plates may each include at least four plates. It has been found that the inclusion of a total of eight plates contained within two subsets gives a highly effective level of friction with or without lubrication between the plates. The first subset and second subset of the plates may be secured by way of one or more fasteners, which may include pin(s) or bolt(s). A pin or bolt may be located within a corresponding aperture in each plate. Such a bolt can retain the plates in position. Another pin or bolt may be located within a slot in each plate. A pin within a slot may allow bending or movement of the plates which can occur when the interleaved plates are pushed together. Using at least two pins or bolts for each subset of plates ensures that the plates are retained in the desired alignment. The clamp pin may pass through the interleaved plates, the clamp mechanism being provided on the clamp pin.

Each subset of plates may include a channel for allowing movement of each subset of plates relative to the clamp pin. The channel for the first subsets may be arranged substantially at right-angles to the channel for the second subset. By doing so, the interleaved plates can allow adjustment of the shroud relative to the support bracket in both reach and rake directions. The first subset and the second subset may be interleaved. Plates of the first subset may be arranged alternately with the plates of the second subset. This gives the greatest number of bearing surfaces and therefore the greatest friction within the interleaved plates.

The cam mechanism may include a fixed cam part and a moving cam part. Movement of the lever may act to rotate the moving cam part relative to the fixed cam part. Cam surfaces of the moving cam part and fixed cam part may result in a length of the cam mechanism changing due to this rotation. The cam mechanism may include a part that fits within one of the slots in the arms of the support bracket. This part may prevent the rotation of a fixed cam part of the cam mechanism and may take the form of a block.

The set of interleaved plates may be a first set of interleaved plates, the assembly further comprising a second set of interleaved plates, the first set of interleaved plates and the second set of interleaved plates being positioned on opposing sides of the shroud. A first subset of the second set of interleaved plates may be secured to the support bracket and a second subset of the second set of interleaved plates may be secured to the shroud.

Having two sets of interleaved plates positioned at opposing sides of the shroud, allows force to be spread evenly or substantially evenly across both sides of the support bracket, avoiding asymmetric loading that could cause twisting or jamming of the assembly.

In the clamped position, the first set of interleaved plates may be compressed between the cam mechanism and the shroud and the second set of interleaved plates may be compressed between the shroud and the support bracket. The first set of interleaved plates may be compressed between the fixed cam of the cam mechanism and the clamp rail of the shroud. The second set of interleaved plates may be compressed between the clamp rail of the shroud and the arm of the support bracket. The second set of interleaved plates may include any of the features above described in relation to the first set of interleaved plates. The first and second sets of interleaved plates may be formed as mirror images of each other.

According to a second aspect, there is provided a steering column assembly for a vehicle, the steering column assembly includes: a shroud; a steering shaft, which is supported by the shroud; a support bracket; a clamp pin and a clamp mechanism. The support bracket configured to be secured to a fixed part of the vehicle and including two arms that depend from a base portion to embrace the shroud. The clamp pin extends through an opening in each of the arms of the support bracket and a slot in the shroud. The clamp mechanism that is movable between an undamped position in which the shroud can move relative to the support bracket and a clamped position in which the shroud is fixed relative to the support bracket.

The clamp mechanism includes a first set of interleaved plates which further includes a first subset of plates and a second subset of plates. The first subset of plates is interleaved with the second subset of plates. The second set of interleaved plates also further includes a first subset of plates and a second subset of plates wherein the first subset of plates is interleaved with the second subset of plates. The first set of interleaved plates and the second set of interleaved plates are positioned on opposing sides of the shroud. The first subset of the first set of interleaved plates are secured to the support bracket and the second subset of the first set of interleaved plates are secured to the shroud. The first subset of the second set of interleaved plates are secured to the support bracket and the second subset of the second set interleaved plates are secured to the shroud.

The cam mechanism is configured such that, in the clamped position of the clamp mechanism, the first set of interleaved plates are compressed together and the second set of interleaved plates are compressed together to restrict relative movement of the shroud and support bracket.

The second aspect provides an assembly with a high clamping force due to the friction within the sets of interleaved plates. Moreover, having two opposing sets of interleaved plates ensures that force is transferred on both sides of the support bracket, which may prevent twisting and/or jamming of the assembly. The second aspect may include any of the features of the first aspect, and vice versa.

BRIEF DESCRIPTION OF THE DRAWINGS

Hereinafter the present disclosure shall be illustrated in detail by way of an embodiment and with reference to the enclosed drawings, wherein.

DETAILED DESCRIPTION

Figure 1:
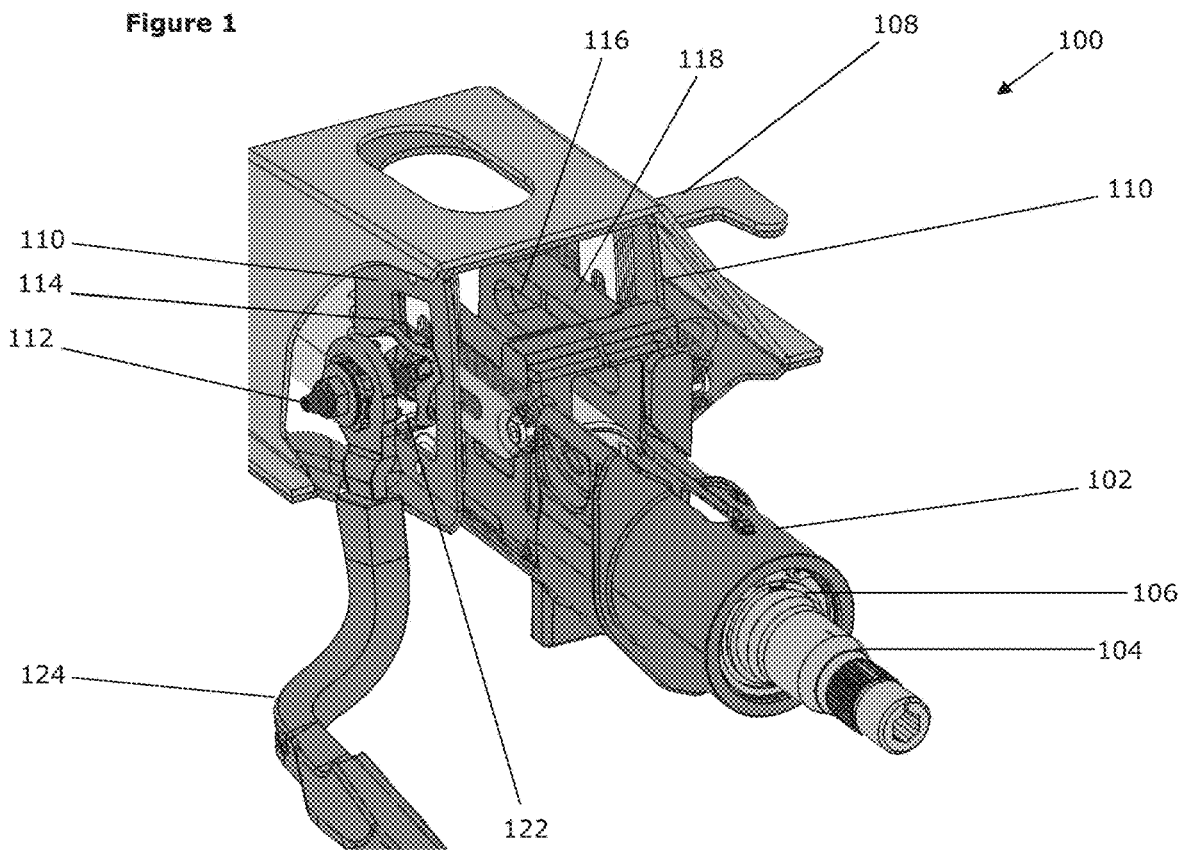
FIG. 1 is a perspective view of an embodiment of a steering column assembly in accordance with the first aspect.
Figure 2:
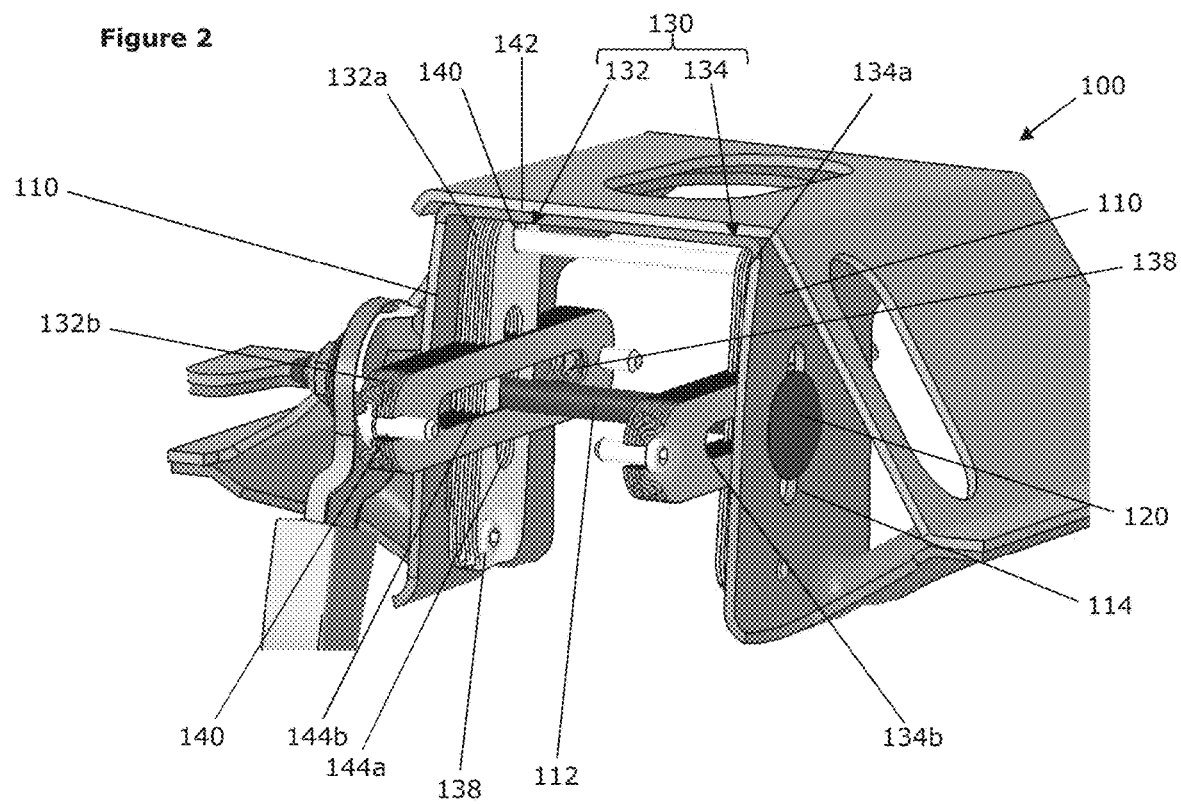
FIG. 2 is a perspective view of the embodiment of FIG. 1 with the shroud and shaft removed, for clarity.

Referring firstly to FIG. 1, there is shown a steering column assembly 100 comprising a shroud 102 that houses a shaft 104. The shaft 104 is configured to be attached to a steering wheel (not shown). The shaft 104 is supported by a bearing assembly 106 that allows rotation of the shaft 104 relative to the shroud 102. A support bracket 108 includes two arms 110 that depend in a substantially vertical direction and provide support and stability to the shroud 102.

A clamp pin 112 passes through vertical slots 114 in the support bracket 108 and a horizontal slot 116 in a clamp rail 118 of the shroud 102. The clamp pin 112 has a stop 120 at one end that prevents the clamp pin 112 being drawn through the support bracket 108. At the other end, a cam mechanism 122 that is rotated by use of a lever 124 enables an effective length of the clamp pin 112, i.e. the length of the clamp pin 112 between the cam mechanism 122 and the stop 120, to be varied. The cam mechanism 122 comprises a fixed cam part 126 and a moving cam part 128, the moving cam part 128 being rotated by the rotation of the lever 124, pushing against the fixed cam part 126 and extending the length of the cam mechanism 122.

A clamp mechanism 130 is also provided on the clamp pin 112. The clamp mechanism 130 includes a first set of interleaved plates 132 and a second set of interleaved plates 134. The sets of interleaved plates 132, 134 are positioned on opposing sides of the shroud 102, between the shroud 102 and the support bracket 108. Each set of interleaved plates 132, 134 includes two sub-sets 132a, 132h, 134a, 134b of four plates such that each set 132, 134 includes eight plates. One subset 132a, 134a of each set of interleaved plates 132, 134 is attached to the support bracket and the other subset 132b, 134b of each set 132, 134 is attached to the shroud 102. Pins 136 are included to secure the interleaved plates 132, 134 whilst allowing movement in the direction of a longitudinal axis of the clamp pin 112. The plates of the two subsets 132a, 132b, 134a, 134b alternate such that the two subsets of each set are interleaved.

In order to accommodate the pins 136, each plate of the interleaved plates 132, 134 includes an aperture 138 and a slot 140. The aperture 138 fits snugly around the pin 136 and holds the plates in position. The slot 140 allows movement of the plates relative to the pin 136 in one direction whilst keeping the plates in the necessary alignment.

The subsets 132a, 134a attached to the support bracket 108 are orientated in a substantially vertical direction, i.e. the plates are aligned with the direction of the arms 110 of the support bracket 108, depending downwards from a base portion 142. A channel 144a in the subsets 132a, 134a attached to the support bracket 108 therefore allows vertical movement rake adjustment—of the shroud 102 relative to the support bracket 108, by movement of the clamp pin 112 within the channel 144a in the subset of plates 132a, 134a and corresponding slots 114 within the arms 110 of the support bracket 108.

The subsets 132b, 134b attached to the shroud 102 are orientated in a substantially horizontal direction, Le, the plates are aligned with the longitudinal direction of the shroud 102 and shaft 104. A channel 144b in the subsets 132b, 134b attached to the shroud 102 therefore allow horizontal movement—reach adjustment of the shroud 102 relative to the support bracket 108, by movement of the subsets of plates 132b, 134b relative to the clamp pin 112.

It is therefore apparent that channels 144a, 144b within each subset allow for adjustment in both reach and rake directions. In the present embodiment the channels 144a, 144b are at right-angles to one another in order that the overall freedom of movement is as great as possible. However, any channels 144a, 144b that are not aligned will allow movement in both reach and rake directions. Similarly, although the vertical plates 132a, 134a are attached to the support bracket 108 and the horizontal plates 132b, 134b are attached to the shroud 102, the opposite could also be true without detriment to operation of the clamp mechanism 130

Figure 3:
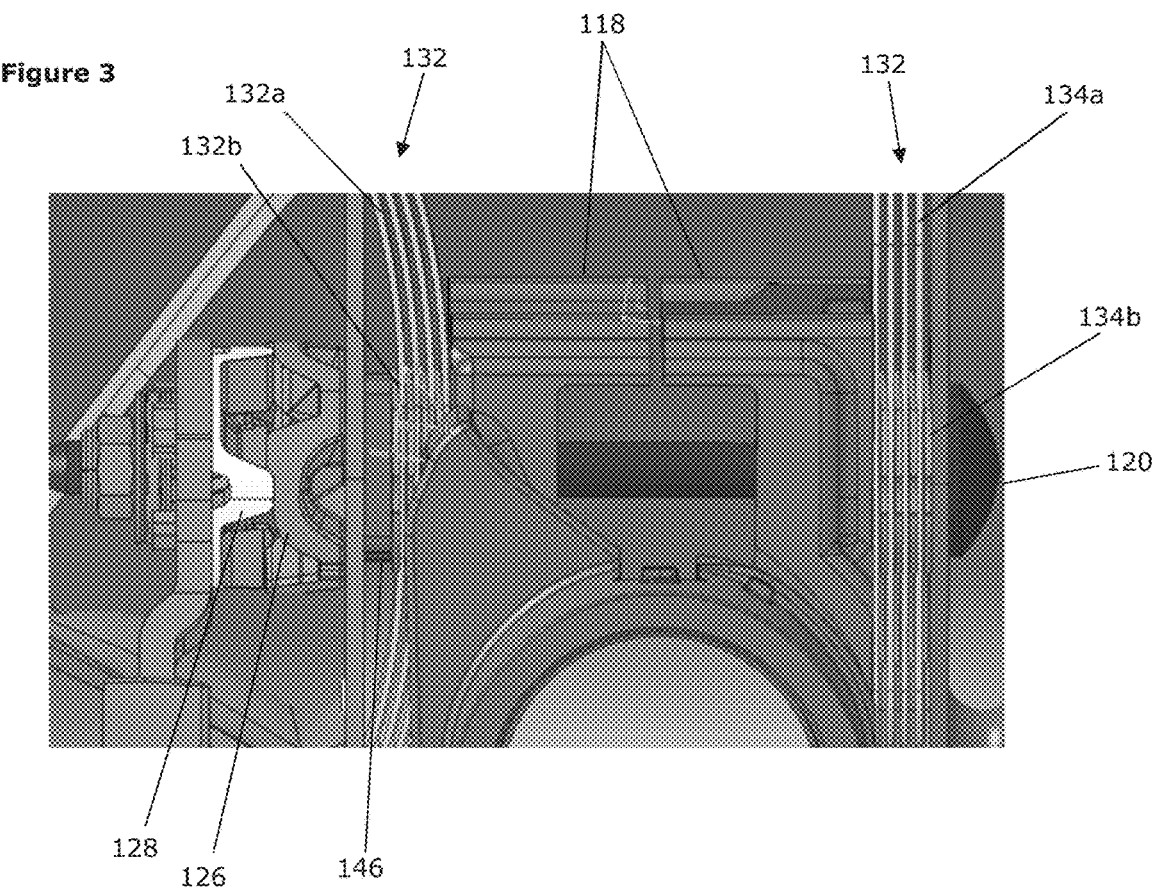
FIG. 3 is a front-on view of the embodiment of FIG. 3 in the clamped position, with movement of the left-side interleaved plates exaggerated.
Figure 4:
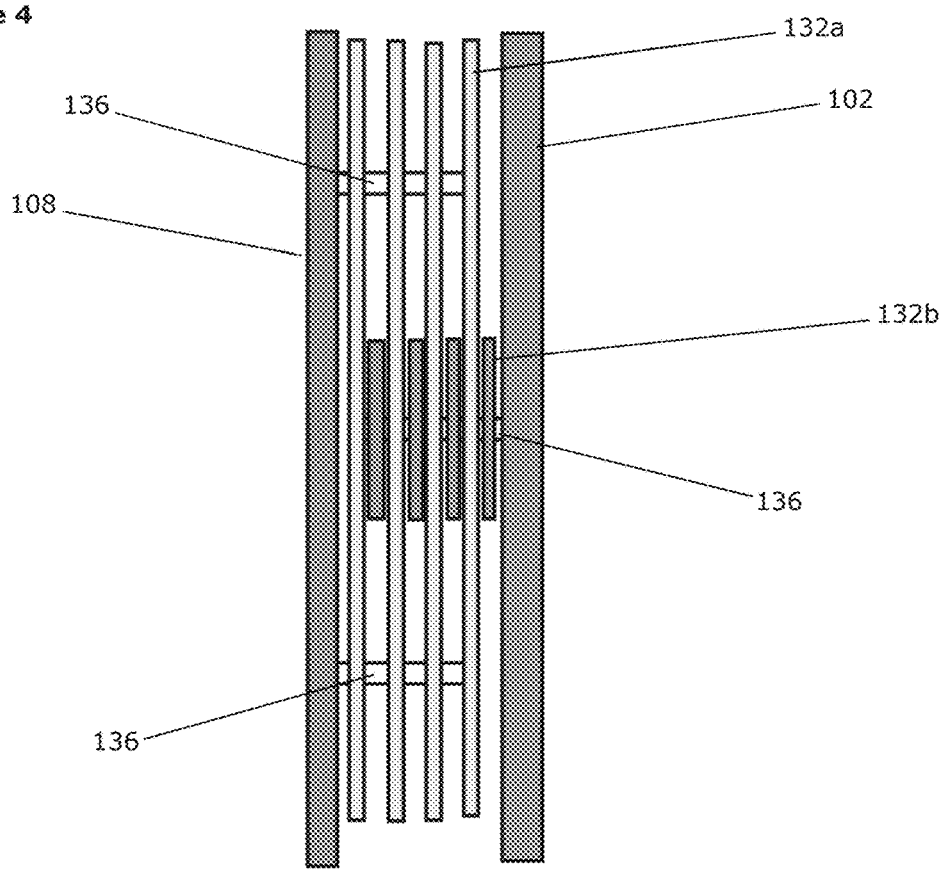
FIG. 4 is a simplified view of one set of the interleaved plates of the embodiment of FIG. 1.

In the unclamped position of the clamp mechanism 130, there is sufficient freedom of movement of the plates relative to one another to allow adjustment of the reach and rake position of the steering column assembly 100 without undue exertion from a user. This may be accomplished through providing sufficient spacing of the plates such that adjacent plates do not have a level of frictional force that would be difficult to overcome by a user, or such that they do not touch whilst unclamped. Lubrication may also be provided, to aid in low-friction movement. The clamping mechanism 130 is shown in the clamped position in FIG. 3. The movement of the plates has been exaggerated for ease of explanation, with actual deflection of the plates being limited to around 2 to 4 mm, in general.

Rotation of the lever 124 leads to extension of the cam mechanism 122 along the clamp pin 112 and thus the cam mechanism 122 extends through the slot 114 in the support bracket 108 and presses against the first set of interleaved plates 132. A block 146 locates the cam mechanism 122 within the slot 114 in the arm 110 of the support bracket 108 and acts to transmit force between the clamp pin 112 and the support bracket 108. The block 146 prevents the rotation of the fixed cam part 126.

Upon clamping, the first set of interleaved plates 132 is pressed into contact with the shroud 102. The shroud 102 is thus pushed over towards the right side of the support bracket 108 and sandwiches the second set of interleaved plates 134 between the shroud 102 and the support bracket 108. The compression of each of the sets of interleaved plates 132, 134 is sufficient to produce a high level of friction between the plates, preventing relative movement of adjacent plates and thus locking the shroud 102 in a desired position relative to the support bracket 108.

Due to the positioning of the sets of interleaved plates 132, 134, a number of friction surfaces interact to prevent relative movement of the shroud 102 and support bracket 108. Friction surfaces are not only provided between the interleaved plates 132, 134 but also between the plates 132, 134 and the shroud 102, the plates 134 and the support bracket 108, and the plates 132 and the cam mechanism 122. Thus, in the depicted embodiment where eight plates are provided in each set of interleaved plates 132, 134, there are a total of eighteen frictional interactions.

The frictional force provided by the clamp mechanism 130 can be estimated as follows:

$$F_f = \mu \cdot N \cdot n$$

$F_f$—friction force (must be above 5 kN to withstand force from shroud)

µ—friction coefficient (0.50 for dry steel to steel, 0.16 for lubricated steel to steel);

N—clamping force (1.8 kN clamp bolt tension is typical)

n—number of friction interactions

In the present embodiment, where each friction surface is formed of steel, with no lubrication the total frictional force will therefore be 16,200 N. In the event that a lubricant is used, which would, in the unclamped position, make adjustment of the steering column assembly 100 easier, the total frictional force would be 5,184 N. As such, it can be seen that, with typical clamping forces and materials selection, both lubricated and non lubricated assemblies fulfil the requirement of a 5 kN minimum frictional force. Where desired, a greater or lesser number of plates may be used, according to design requirements.

By providing two sets of interleaved plates 132, 134, the force transmitted through the shroud can be passed in a symmetrical manner to the support bracket 108. This will prevent or limit uneven loading on the support bracket 108, which could lead to warping, twisting, or other non-desirable effects.

The positioning of the interleaved plates 132, 134 between the arms 110 of the support bracket 108 ensures that the outside surface of the support bracket 108 is not encumbered by the positioning of the plates, i.e. the plates do not affect the packaging limits of the support bracket 108. This can be advantageous as it can be desirable to place strengthening struts or other features, for example, on the outside of the support bracket 108. In the present invention, such features may be freely added to the outside without affecting the operation of the clamping mechanism 130.

Although the depicted embodiment includes two sets of interleaved plates 132, 134 positioned either side of the shroud 102, the enhanced clamping provided by the sets of interleaved plates 132, 134 can still be achieved by the use of a single set of interleaved plates 132, 134. In this scenario, the first set of interleaved plates 132, i.e. the set interposed between the cam mechanism 122 and the shroud 102, may be provided and the second set 134 omitted. The compression of the first set of interleaved plates 132 will therefore result in the shroud 102 directly contacting the support bracket 108, a single friction surface being provided in place of the second set of interleaved plates 134.

What is claimed is:

1. A steering column assembly for a vehicle, the steering column assembly comprising:
   a shroud;
   a steering shaft, which is supported by the shroud;
   a support bracket configured to be secured to a fixed part of the vehicle and including two arms that depend from a base portion to embrace the shroud;
   a clamp pin that extends through an opening in each of the arms of the support bracket and a slot in the shroud; and
   a clamp mechanism that is movable between an unclamped position in which the shroud can move relative to the support bracket and a clamped position in which the shroud is fixed relative to the support bracket;
   wherein the clamp mechanism comprises:
      a set of interleaved plates secured between the two arms of the support bracket, a first subset of the interleaved plates being secured to the support bracket and a second subset of the interleaved plates being secured to the shroud; and
      a cam mechanism configured such that, in the clamped position of the clamp mechanism, the interleaved plates are compressed between the cam mechanism and the shroud to restrict relative movement of the shroud and support bracket.

2. A steering column assembly according to claim 1 wherein the first subset and second subset of the interleaved plates each include at least four plates.

3. A steering column assembly according to claim 1 wherein the first subset and second subset of the interleaved plates are secured by way at least one fastener.

4. A steering column assembly according to claim 3 wherein the at least one fastener includes a fastener receivable within an aperture in each plate and a fastener receivable within a slot in each plate.

5. A steering column assembly according to claim 3 wherein the at least one fastener includes a pin or bolt.

6. A steering column assembly according to claim 1 wherein the clamp pin passes through the interleaved plates, the clamp mechanism being provided on the clamp pin.

7. A steering column assembly according to claim 6 wherein each subset of interleaved plates includes a channel for allowing movement of each subset of interleaved plates relative to the clamp pin.

8. A steering column assembly according to claim 7 wherein the channel in the first subset is arranged substantially at right-angles to the channel in the second subset.

9. A steering column assembly according to claim 1 wherein the first subset and second subset are interleaved.

10. A steering column assembly according to claim 9 wherein plates in the first subset and plates in the second subset are arranged alternately in the set of interleaved plates.

11. A steering column assembly according to claim 1 wherein the set of interleaved plates are a first set of interleaved plates, the assembly further comprising a second set of interleaved plates, the first set of interleaved plates and the second set of interleaved plates being positioned on opposing sides of the shroud,
   a first subset of the second set of interleaved plates being secured to the support bracket and a second subset of the second set of interleaved plates being secured to the shroud.

12. A steering column assembly according to claim 11 wherein, in the clamped position, the first set of interleaved plates is compressed between the cam mechanism and the shroud and the second set of interleaved plates is compressed between the shroud and the support bracket.

13. A steering column assembly for a vehicle, the steering column assembly comprising:
   a shroud;
   a steering shaft, which is supported by the shroud;
   a support bracket configured to be secured to a fixed part of the vehicle and including two arms that depend from a base portion to embrace the shroud;
   a clamp pin that extends through an opening in each of the arms of the support bracket and a slot in the shroud; and
   a clamp mechanism that is movable between an unclamped position in which the shroud can move relative to the support bracket and a clamped position in which the shroud is fixed relative to the support bracket;
   wherein the clamp mechanism comprises:
      a first set of interleaved plates and a second set of interleaved plates, the first set of interleaved plates and the second set of interleaved plates being positioned on opposing sides of the shroud,
      a first subset of the first set of interleaved plates being secured to the support bracket and a second subset of the first set of interleaved plates being secured to the shroud;
      a first subset of the second set of interleaved plates being secured to the support bracket and a second subset of the second set interleaved plates being secured to the shroud; and
      a cam mechanism configured such that, in the clamped position of the clamp mechanism, the first set of interleaved plates are compressed together and the second set of interleaved plates are compressed together to restrict relative movement of the shroud and support bracket.

14. A steering column assembly according to claim 13 wherein each set of interleaved plates is configured to be compressed between the cam mechanism and the shroud.

15. A steering column assembly according to claim 13 wherein the first and second sets of interleaved plates are secured between the two arms of the support bracket.

16. A steering column assembly according to claim 13 wherein the first set of interleaved plates are secured between one arm of the support bracket and the shroud, the first set of interleaved plates being pressed into contact with the shroud when the clamp mechanism is in the clamp position.

17. A steering column assembly according to claim 1 wherein the interleaved plates are secured between one arm of the support bracket and the shroud, the interleaved plates being pressed into contact with the shroud when the clamp mechanism is in the clamp position.

18. A steering column assembly for a vehicle, the steering column assembly comprising:

a shroud;

a steering shaft, which is supported by the shroud;

a support bracket configured to be secured to a fixed part of the vehicle and including two arms that depend from a base portion to support the shroud;

a clamp pin that extends through an opening in each of the arms of the support bracket and a slot in the shroud; and a clamp mechanism that is movable between an unclamped position in which the shroud can move relative to the support bracket and a clamped position in which the shroud is fixed relative to the support bracket;

wherein the clamp mechanism comprises:

a set of interleaved plates, a first subset of the interleaved plates being secured to the support bracket and a second subset of the interleaved plates being secured to the shroud; and a cam mechanism configured such that, in the clamped position of the clamp mechanism, the interleaved plates are compressed between the cam mechanism and the shroud and pressed into contact with the shroud to restrict relative movement of the shroud and support bracket.

19. A steering column assembly according to claim 18, wherein the set of interleaved plates are a first set of interleaved plates, the assembly further comprising a second set of interleaved plates, the first set of interleaved plates and the second set of interleaved plates being positioned on opposing sides of the shroud, a first subset of the second set of interleaved plates being secured to the support bracket and a second subset of the second set of interleaved plates being secured to the shroud.

20. A steering column assembly according to claim 19, wherein, in the clamped position, the first set of interleaved plates is compressed between the cam mechanism and the shroud and pressed into contact with the shroud, and the shroud presses against the second set of interleaved plates to compress the second set of interleaved plates between the shroud and the support bracket.

* * * * *